Nov. 13, 1962 R. D. KELL 3,064,134
DISPLAY DEVICE
Filed Nov. 15, 1960
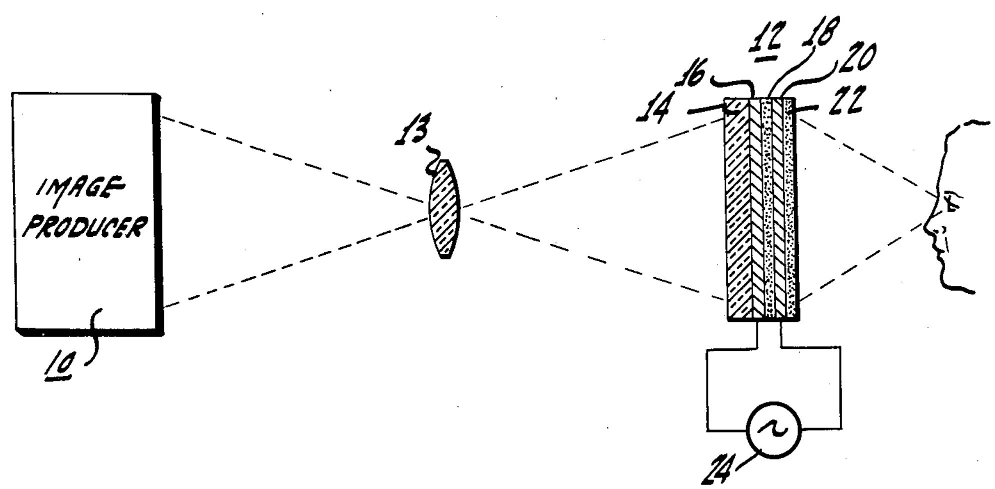
INVENTOR.
Ray D. Kell
BY L. A. Larsen
Attorney United States Patent Office 3,064,134

Patented Nov. 13, 1962

3,064,134

DISPLAY DEVICE

Ray D. Kell, Princeton, N.J., assignor to Radio Corporation of America, a corporation of Delaware Filed Nov. 15, 1960, Ser. No. 69,466
3 Claims. (Cl. 250—213)

This invention relates to display devices. In particular, this invention relates to an image reproducer type display device.

In most of the known display devices, the device itself must generate both the brightness and the scene information. In certain instances, this is extremely undesirable. For example, when viewing a P.P.I. radar display while in high ambient illumination, such as in an aircraft, the amount of brightness that must be developed by the display device before the signal can be properly seen is large. When this high brightness level is reached, the device must further produce the signal information as a contrast to the brightness. Such procedure necessarily requires the use of large power supplies and other undesirable conditions.

It is therefore an object of this invention to provide a new and improved display device.

It is a further object of this invention to provide a novel display device that can readily be viewed even when the ambient light level is high.

These and other objects are accomplished in accordance with this invention by providing a display device that includes a thermo-chromatic material positioned in a heat exchange relationship with a thermal-image producing means. By coupling an image of a scene to be reproduced onto the thermal-image producing means, and by coupling the thermal-image to the thermo-chromatic material, a visible image is produced on the thermo-chromatic material which is proportional to the intensity of the light from the scene. The image produced by the thermo-chromatic material is of two colors, one for the areas energized by the heat and a different color for that of the areas which are not so energized. Thus, only the signal information is produced by the viewing device and the non-signal brightness level is automatically provided by the color of the thermo-chromatic material in its unexcited regions.

The invention will be more clearly understood by reference to the accompanying single sheet of drawings wherein:

The single FIGURE is a schematic representation of one form of this invention.

Referring now to the drawing, there is shown an image producer 10. The image producer 10 may be any of the many known image producing devices such as a cathode ray tube, a display storage tube, an electroluminescent panel or other similar image producing device. Also, the image may be caused by the light directly from a scene to be reproduced. The image may be in the form of a visible light, infra-red radiation, X-rays or other known radiations. The optical image from the image producer 10 is focused onto a display device 12 by means of any suitable imaging lens system represented by a lens 13. The optical image may however, be applied directly to the display device 12. For example, the face of a display cathode ray tube may be placed in direct contact with the display device 12.

The display device 12 comprises a support member 14 which is made of any material that is transparent to the image from the image producer 10. As an example, when the image from the producer 10 is a visible image, the support member 14 may be made of glass or of a light transparent plastic, for example Mylar. If the image from the image producer 10 is infra-red, a support member of mica may be used.

On the support member 14 there is provided an electrical conductive coating 16. The conductive coating 16 is also transparent to the image from the image producer 10. As an example, a transparent conductive coating of tin oxide may be used.

On the transparent conductive coating 16 there is provided a layer of material 18 which generates heat when it is exposed to an image. One example of a material which may be used for the heat generator 18 is a photoconductor. The heat generating layer 18 is selected for its property of developing heat in response to an input image. The photoconductor, with a potential difference applied thereacross, develops heat, because of current flow through the photoconductor when the photoconductor is exposed to radiation. The heat generation in a photoconductor occurs only in the areas in which the current flows and thus is confined to the illuminated elemental areas. The amount of heat generated is proportional to the amount of resistance change which, in turn, is proportional to the amount of light from the screen. One of the known photoconductive materials which may be deposited in large areas is powdered cadmium sulfide supported in a dielectric binding material such as ethyl cellulose or polystryrene. The photoconductive material and binder may be approximately one to ten mils thick. Other photoconductive materials, such as cadmium selenide for example, may also be used.

On the heat generating layer 18 there is provided a thin electrical conductor 20 which may be either transparent, e.g. tin chloride, or opaque, e.g. aluminum. The electrical conductor 20 should be thin, e.g. approximately 1 mil, so that the thermal-image developed will not tend to spread laterally which would result in loss of image resolution.

On the electrical conductor 20 there is provided a layer of thermo-chromatic material 22. One example of thermo-chromatic material is copper mercuric iodide in a suitable binder such as glyptol or varnish. The thermo-chromatic material 22 may be sprayed or brushed on and may be approximately 0.1 mil thick.

During operation of the device 12, a potential difference is applied between the conductors 16 and 20 by means of electrical power source 24. When an image from the image producer 10 strikes the heat generating means 18, the layer 18 produces a heat image that corresponds to the optical image from the image producer 10. In the particular example given above, the heat image is caused by electrical current flow through the photoconductor proportional to the illumination in the various areas of the optical image. The heat image from the heat generating element 18 is coupled by heat conduction, through the conductive layer 20 to the thermo-chromatic material 22 so that the thermo-chromatic material changes color because of the change in temperature. As an example, a copper mercuric iodide layer will change from bright-red in color, when the material is below approximately 70° C., to jet black in color when the temperature is about 75° C. or greater. Such changes in color are reversible. A potential difference of 50 volts A.C., for example, between the electrodes 16 and 20 provides sufficient current flow to generate sufficient heat to raise the temperature of the thermo-chromatic material the required 5° in the particular example given. Another example of a thermo-chromatic material is mercuric iodide which changes from a yellow color to red at about 126° C.

In the areas of the scene to be reproduced, which are not excited by light, there is no current flow through the photoconductor 18. In the illuminated areas there is a current flow, which is proportional to the amount of illumination striking the photoconductor 18 resulting in a localized thermal-image. The localized heating produces a negative visible image of the original optical image that has been applied to the photoconductor. Thus, light may be projected through photographic negatives and onto the photoconductor material 18 and positive pictures may then be viewed on the thermo-chromatic material 22. The maximum speed of response of the device is believed to be limited primarily by the lag which occurs in the photoconductor. Thus, under proper lighting conditions, a response time of 1/30 of a second can be obtained.

It should be understood that, when the image producer 10 is a cathode ray tube, the face plate is preferably thin so that the image will not be diffused as it passes through the glass face plate. One example of a thin window tube may be found in an article entitled, "Thin-Window Cathode Ray Tube for High Speed Printing with Electrofax," by R. C. Olden, which appeared in the RCA Review of September 1957.

Thus, applicant's invention is particularly useful in instances wherein the viewing is to be done under high ambient lighting conditions. Also, this invention is particularly useful when a thin light weight display device is desired.

What is claimed is:

1. An image display device comprising a glass support member, a transparent electrical conductive coating on said support member, a layer of powdered cadmium sulfide on said coating, a conductor on said layer of cadmium sulfide, and a layer of copper mercuric iodide on said conductor.

2. An image display device comprising a support member, a light transparent electrical conductive coating on said support member, a layer of powdered cadmium selenide on said coating, a conductor on said layer of cadmium selenide, a layer of copper mercuric iodide on said conductor and in heat receiving relationship with said layer of cadmium selenide.

3. An image display device comprising a transparent support member, a light transparent electrical conductive coating on said support member, a layer of a photoconductive powder and binder on said conductive coating, a conductor on said layer, and a layer of mercuric iodide on said conductor.

References Cited in the file of this patent

UNITED STATES PATENTS

| | | |
|---|---|---|
| 2,663,657 | Miller et al. | Dec. 22, 1953 |
| 2,880,110 | Miller | Mar. 31, 1959 |
| 3,001,447 | Ploke | Sept. 26, 1961 |